United States Patent [19]

Lehmann

[11] Patent Number: 5,651,897
[45] Date of Patent: Jul. 29, 1997

[54] WET OXIDATION OF HIGH STRENGTH LIQUORS WITH HIGH SOLIDS CONTENT

[76] Inventor: Richard W. Lehmann, 2403 Red Maple Rd., Wausau, Wis. 54403

[21] Appl. No.: 740,174

[22] Filed: Oct. 28, 1996

Related U.S. Application Data

[63] Continuation-in-part of Ser. No. 509,041, Jul. 28, 1995, abandoned.

[51] Int. Cl.$^6$ .................................................. C02F 1/74
[52] U.S. Cl. .......................................... 210/761; 588/226
[58] Field of Search .................................. 210/761, 762, 210/763; 588/226

[56] References Cited

U.S. PATENT DOCUMENTS

| | | |
|---|---|---|
| 4,251,227 | 2/1981 | Othmer . |
| 4,330,038 | 5/1982 | Soukup et al. . |
| 5,240,619 | 8/1993 | Copa et al. . |

FOREIGN PATENT DOCUMENTS 22367  2/1980  Japan .

Primary Examiner—Neil McCarthy
Attorney, Agent, or Firm—Tipton L. Randall

[57] ABSTRACT

Disclosed is a process for wet oxidation treatment of high strength liquor or wastewater to destroy a substantial portion of the pollutants and produce an effluent stream containing a high solids content for recovery or disposal. The liquor is treated by wet oxidation and separate vapor and liquid streams are removed from the wet oxidation reactor. The vapor stream is cooled and separated to give a liquid condensate phase and a gaseous phase. The liquid stream from the reactor is cooled and divided, with a portion of the liquid effluent sent to recovery or disposal, and a portion combined with the condensate phase. This low pollutant content stream is used to dilute the raw feed liquor and maintain a high solids concentration in the liquid effluent stream.

21 Claims, 2 Drawing Sheets

WET OXIDATION OF HIGH STRENGTH LIQUORS WITH HIGH SOLIDS CONTENT

This application is a continuation-in-part of application Ser. No. 08/509,041 filed Jul. 28, 1995, now abandoned.

FIELD OF THE INVENTION

This invention is concerned with the wet oxidation of concentrated liquors for pollutant removal. More particularly, it is concerned with a wet oxidation process for treating these liquors to produce an oxidized effluent of high solids content.

BACKGROUND OF THE INVENTION

Wet oxidation treatment is well suited to high strength liquors or wastewaters. Not all material needs to be considered "waste" to be treated by wet oxidation. This liquid phase oxidation treatment at elevated temperature and pressure with an oxygen gas source destroys a substantial portion of the pollutants in these wastewaters. The oxidation reactions which degrade the pollutants generate significant heat energy. The liquid phase in the wet oxidation system acts as a heat sink and absorbs this energy by conversion of liquid water to steam, providing one means of temperature control in the process.

These high strength liquors or wastewaters may also contain high concentrations of dissolved salts and/or suspended solids. Additional salts and/or solids may be generated by the wet oxidation reactions of the pollutants in the wastewater. Evaporation of the liquid phase, described above, also increases the concentration of dissolved salts and/or suspended solids in the wet oxidation system.

High solids concentrations in the wet oxidation system can produce a variety of negative effects. If the solubility of the dissolved salts is exceeded, the system can be plugged with scaling products, crystals or other forms of solids.

High solids concentrations also can interfere with the transfer of oxygen from the gas phase to the liquid phase and thus inhibit the wet oxidation process. Additionally, higher solids concentrations tends to increase the corrosive characteristics of the liquor or waste being processed. In all cases, the undesirable effects are magnified as the solids concentration in the system increases.

As a companion to pollutant destruction, it may be desirable to recover the dissolved/suspended solids from the wet oxidation treated liquor or wastewater. In this case a high solids content effluent is preferred. Thus, treating a liquor or wastewater with high pollutant content and high solids content may result in opposed objectives, and can be quite difficult. The usual solution to the operational difficulties encountered for this type of liquor or wastewater is to dilute the incoming feed liquor or wastewater to reduce both the pollutant and solids concentrations. This is not a good approach when one treatment goal is to produce a high solids content effluent product. The problem then becomes how to dilute the pollutant concentration without diluting the solids concentration, and at the same time avoid the formation of solid scales and/or crystals, and minimize the effects of solids concentration on oxygen transfer and materials of construction factors.

It is an objective of the instant invention to treat a high pollutant concentration liquor or wastewater by wet oxidation to remove a substantial portion of the pollutants. It is also an objective to minimize the negative effects of high solids concentrations in the wet oxidation system. It is a further objective to produce an effluent stream of high solids content, for recovery or disposal of said solids within that effluent stream.

Japanese patent publication JP 55022367 assigned to Asahi Chemical Industries KK discloses a wet oxidation catalyzed with copper salt with an ammonium salt present where a portion of the oxidized liquor is recycled to dilute the COD concentration of the feed waste liquor. The copper catalyst is recovered from the effluent for reuse in the process.

Othmer in U.S. Pat. No. 4,251,227 describes the wet oxidation treatment of wet solid wastes or low grade fuels to produce a low moisture fuel for various uses, plus several other effluent liquid streams which may or may not be recycled to the wet oxidation process.

Soukup et al. in U.S. Pat No. 4,330,038 discloses a wet oxidation process for steam flooding of oil-bearing formations where water from the formation and condensate from the wet oxidation system are recycled to the process to further treat these liquid streams.

Copa et al. in U.S. Pat. No. 5,240,619 describe several two-stage wet oxidation flow schemes where the vapor phase and liquid phase from a subcritical wet oxidation reactor are routed to an additional supercritical wet oxidation treatment step.

None of the above references have addressed the problem of producing a single high solids content effluent from the wet oxidation treatment of a high pollutant concentration liquor or wastewater. Applicant has devised such a process as described below.

SUMMARY OF THE INVENTION

The invention comprises a process for wet oxidation of high strength pollutant containing liquor or wastewater, with a COD of about 25 g/l to about 1,000 g/l, to produce a high solids content oxidized effluent comprising the steps of mixing a wastewater feed stream and an oxygen-containing gas to form an oxidation feed mixture comprising a gas phase and a liquid phase. The oxidation mixture is heated in a reaction zone to a temperature and a pressure sufficient to maintain a portion of the wastewater in the liquid phase, for a time sufficient to remove a substantial portion of the pollutants, at least about 50 percent of the COD of the pollutants. The gas phase from said reaction zone is withdrawn, cooled and depressurized by cooling means and depressurizing means to produce an off gas phase and a liquid condensate phase. The offgas phase is separated from the liquid condensate phase by separating means. The liquid phase from said reaction zone is withdrawn, cooled and depressurized by cooling means and depressurizing means to produce an oxidized effluent phase of high solids content. The oxidized effluent contains dissolved solids at about 50 percent of saturation up to nearly complete saturation of the liquid. A portion of the high solids content oxidized effluent phase is combined with the liquid condensate phase to give a low pollutant content stream, containing less than about 50 percent of the COD of the high strength wastewater. The high strength pollutant containing wastewater is diluted with the low pollutant content stream to give the wastewater feed stream of the first step.

In an alternative embodiment of the invention, the high strength pollutant containing liquor with a COD of about 25 g/l to about 1,000 g/l, is mixed with oxygen-containing gas and recycled brine and condensate directly within said reaction zone.

DESCRIPTION OF THE PREFERRED EMBODIMENTS

Figure 1:
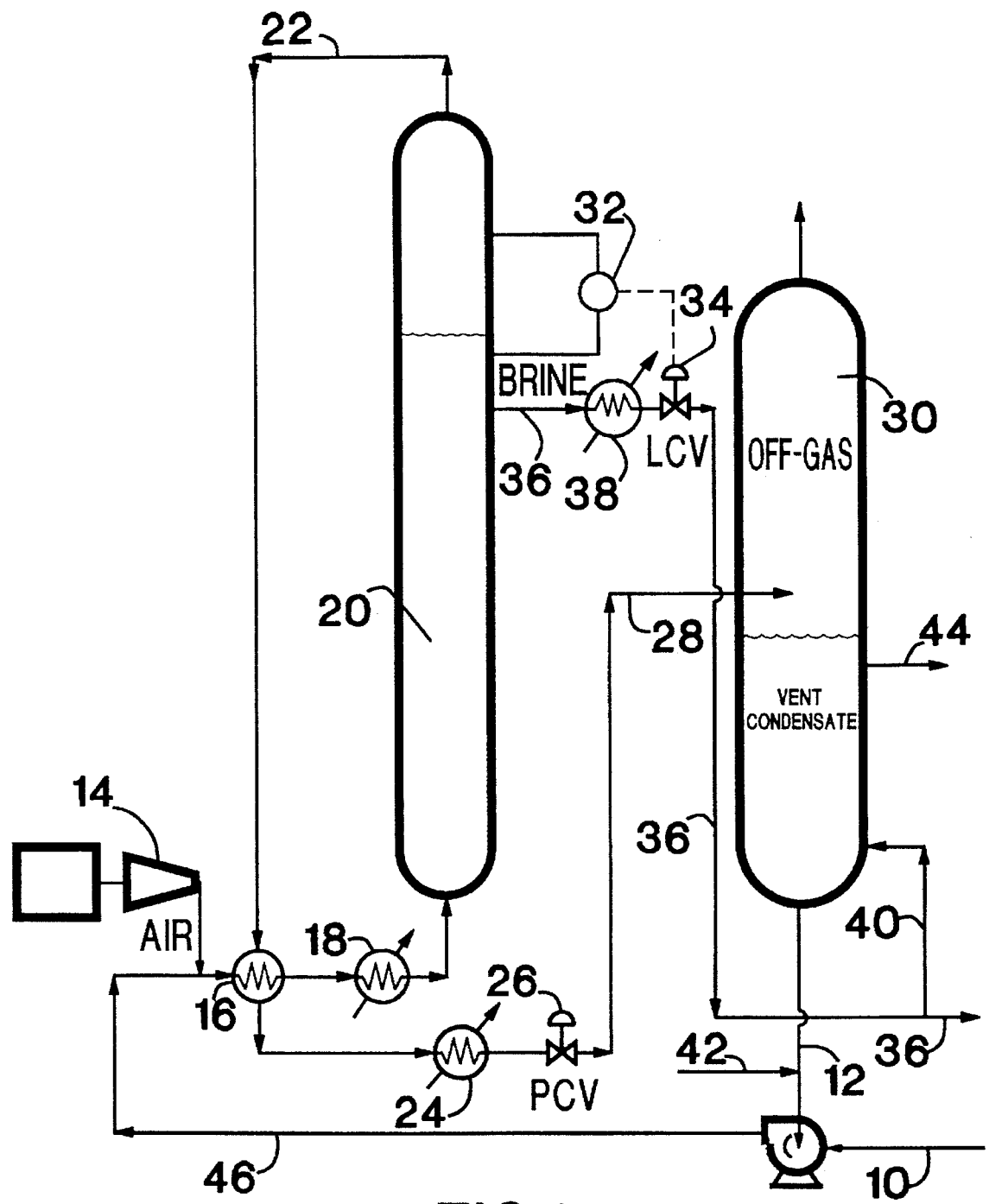
FIG. 1 shows a schematic flow diagram of one embodiment of the wet oxidation treatment process.

Referring to FIG. 1, a feed liquor or wastewater in line 10 is mixed with oxidized effluent from a recycle line 12 The feed liquor or wastewater is a high strength pollutant containing stream with a Chemical Oxygen Demand (COD) of about 25 g/l to about 1,000 g/l. The relative flow rates of wastewater in line 10 and oxidized effluent from the recycle line 12 are controlled such that the concentration range of pollutants is well suited for wet oxidation treatment since the waste contains sufficient energy to allow self sustaining operation, while it is not so concentrated that excessive evaporation is required to control system temperature.

The oxidized effluent is a low pollutant content stream which has been oxidized to remove at least about 50 percent of the COD of the pollutants therein. An oxygen-containing gas, such as air, oxygen enriched air or essentially pure oxygen, from a compressor 14 is added to this diluted feed to form an oxidation feed mixture comprising a gas phase and a liquid phase. The oxidation mixture is heated in a process heat exchanger 16, and additional heating is supplied by an auxiliary heater 18. The heated oxidation mixture enters a wet oxidation reactor 20 or reaction zone, where the majority of the oxidation reaction occurs. The reactor 20 shown is a vertical bubble column pressure vessel, well known in the industry. The temperature and pressure in the reactor are maintained such that a portion of the liquor or wastewater remains in the liquid phase. That is, the temperature is maintained below the critical temperature of water, 374° C. Maintaining the presence of a liquid phase is important since dissolved salts in the liquor become insoluble above the critical temperature of water. The insoluble salts can quickly scale up or totally obstruct the piping or reactor of the wet oxidation system.

The liquor or wastewater is maintained within the reactor 20 for a time sufficient to remove a substantial portion of the pollutants from the waste. Generally, at least about 50 percent of the Chemical Oxygen Demand (COD) of the pollutants in the liquor or wastewater is removed by the oxidation process. The removal of 70 to 75 percent of the COD, or even 90 percent of the COD, may be desirable in some instances. The degree of COD removal will depend upon the nature of the wastewater as well as the treatment objectives for the system. The oxidation reactions within the reaction zone or reactor 20 are exothermic and generate significant energy in the form of heat, particularly with high strength liquors in the 25 g/l to 1,000 g/l COD range. Excess heat can be removed from the system by evaporation of a portion of the liquid phase to the vapor phase. The offgas and vapor phase exit the top of the reactor 20 via a conduit 22. The vapors are cooled in the process heat exchanger 16 against the oxidation feed mixture. The vapors are further cooled by an auxiliary process cooler 24. This produces a mixture of liquid condensate and non-condensible gases which are taken to atmospheric pressure through a pressure control valve 26. The depressurized mixture flows via a conduit 28 to a separator tank 30 where liquid/gas phase separation occurs. The condensate liquid may contain volatile compounds which were present in the waste or were formed during the wet oxidation treatment. These substances are recycled to the wet oxidation system for additional treatment as described below.

The liquid level within the reactor 20 is controlled by a level control sensor 32 which is connected to a level control valve 34. The concentration of solids in the liquid phase are high due to the evaporation of a portion of the liquid within the reactor. The solids in the liquid are generally soluble salts at concentrations varying from about 50 percent of saturation up to nearly the saturation level therein. The numerical value for the solids content of the stream will vary, depending upon the particular salt or salts involved. A conduit 36 from the reactor 20 removes a stream of oxidized liquid from below the liquid level surface within the reactor or reaction zone. The liquid is cooled by a second auxiliary process cooler 38 and then traverses a level control valve 34, which depressurizes the liquid, which then flows to further processing via said oxidized effluent conduit 36. The high concentration of dissolved and/or suspended solid in the liquid phase results in comparatively low concentrations of dissolved gases in this cooled liquid phase. A portion of the cooled oxidized liquid phase, or brine, is split from the effluent conduit 36, transported through a conduit 40, and combined with the vent condensate liquid phase within the separator vessel 30. This mixture is transported through a conduit 12 to a high pressure feed pump where it is mixed with feed liquor to dilute the pollutant and solids concentrations prior to treatment in the wet oxidation system.

This flow scheme has several unique advantages compared to prior art processes. First, a single effluent stream of high solids content is produced. The solids content can vary from about 50 percent of saturation up to nearly the saturation level for the dissolved solids, such as inorganic salts, at ambient temperature and pressure conditions. The numerical value for the solids content of the stream will vary, depending upon the particular salt or salts involved. It may be desirable to recover dissolved or suspended solids from the effluent stream, or to minimize the volume of aqueous effluent which requires further treatment or disposal. These objectives are easily attained by the process described above.

Second, depending on the particular characteristics of the raw wastewater and the high solids content effluent, the addition of a relatively small flow of dilution water to the feel line 12, via a conduit 42, may be required to provide the desired effluent composition. The need for the addition of this dilution water can result from the generation of additional solids or salts in the wet oxidation treatment system which require additional aqueous volume to maintain solubility, or to compensate for water vapor lost with the gases from the phase separation vessel. The dilution water should contain little or no pollutants or solids, and could come from a cooling water stream, a potable water source or the like. In this scenario, no other liquid stream requiring additional treatment is generated.

Alternatively, the removal from the separator tank 30 of a relatively small flow of the condensate stream via a conduit 44 may be required to provide the desired effluent composition. This removal may be needed to raise the concentration of solids or salts in the oxidized effluent to a particular desired level. This small condensate stream may require some additional treatment before discharge.

The addition or removal of these small flows is required to maintain the overall water balance for the wet oxidation treatment system.

Third, any volatile components present in the raw wastewater or generated from the wet oxidation reactions are collected in the vent condensate liquid contained within the separator vessel 30. These components are recycled back through the wet oxidation system with the liquid phase for one or more residence time periods where further oxidation can occur.

Figure 2:
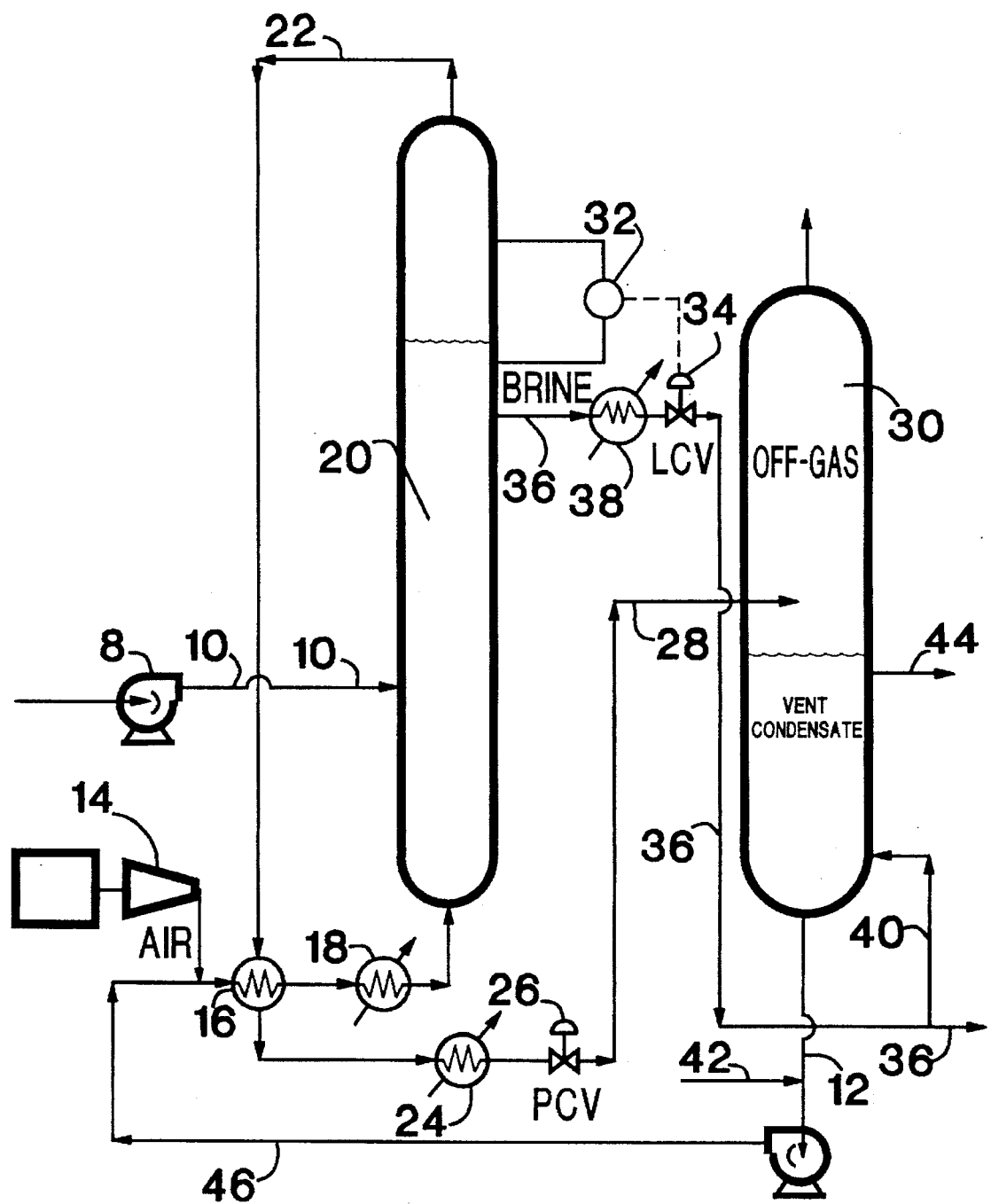
FIG. 2 shows a schematic flow diagram of another embodiment of the wet oxidation treatment process.

Referring to FIG. 2, another embodiment of the invention is shown. Those elements common with FIG. 1 are denoted with the same indica. In FIG. 2 the high strength wastewater is pressurized with a feed pump 8 and injected directly into the reactor 20, or reaction zone, via a feed liquor line 10. Again, the high strength pollutant containing stream has a COD of about 25 g/l to about 1,000 g/l. The condensate phase and a portion of the brine liquor phase are combined in the separation vessel to form a low pollutant content stream, as described in FIG. 1, and mixed with the oxygen-containing gas from a compressor 14 within another conduit 46. This oxidized effluent is a low pollutant content stream which has at least about 50 percent of the COD of the pollutants removed as described in FIG. 1. This mixture is heated by the process heat exchanger 16 and the auxiliary heater be and then enters the reactor vessel 20, or reaction zone, to mix with and dilute the high strength feed from the conduit 10. The remainder of the process operates as described in FIG. 1.

Alternatively, the oxygen-containing gas may be split between the low pollutant content stream and the feed liquor stream, or the oxygen-containing gas may be mixed only with the feed liquor stream in the feed liquor line 10 prior to entry of the mixture into the reactor 20. The remainder of the system operates as described for FIG. 1 above.

Again, a relatively small flow of dilution water may be required to provide the desired effluent composition. This dilution water may be added to the low strength oxidation mixture in the feed line 12, via a conduit 42, or to the high strength wastewater before it enter the feed pump 8.

Likewise, the removal from the separator tank 30 of a relatively small flow of the condensate stream via a conduit 44 may be required to provide the desired effluent composition for the reasons described above.

While the invention has been particularly shown and described with reference to a preferred embodiment thereof, it will be understood by those skilled in the art that various changes in form and details may be made therein without departing from the spirit and scope of the invention.

I claim:

1. A process for wet oxidation of high strength pollutant containing wastewater with a COD of about 25 g/l to about 1,000 g/l, to produce a high solids content oxidized effluent comprising the steps;

(a) mixing a wastewater feed stream and an oxygen-containing gas to form an oxidation feed mixture comprising a gas phase and a liquid phase;

(b) heating said oxidation mixture in a reaction zone to a temperature and a pressure sufficient to maintain a portion of said wastewater in the liquid phase, for a time sufficient to remove at least about 50 percent of the COD of the pollutants therein;

(c) withdrawing said gas phase from said reaction zone, cooling and depressurizing said gas phase by cooling means and depressurizing means to produce an offgas phase and a liquid condensate phase;

(d) separating said offgas phase from said liquid condensate phase by separating means;

(e) withdrawing said liquid phase from said reaction zone, cooling and depressurizing said liquid phase by cooling means and depressurizing means to produce an oxidized effluent phase of high solids content, said effluent phase having dissolved solids content at about 50 percent of saturation up to nearly complete saturation of the liquid phase therein;

(f) combining a portion of said high solids content oxidized effluent phase with said liquid condensate phase to give a low pollutant content stream containing less than about 50 percent of the COD of said high strength wastewater; and (g) diluting said high strength pollutant containing wastewater with said low pollutant content stream to give the wastewater feed stream of step a.

2. A process according to claim 1 wherein said oxygen-containing gas comprises air, oxygen enriched air or essentially pure oxygen.

3. A process according to claim 1 wherein said reaction zone comprises a vertical bubble column pressure vessel.

4. A process according to claim 1 wherein said cooling means in step c comprises a process heat exchanger or a process cooler.

5. A process according to claim 1 wherein said depressurizing means of step c comprises a pressure control valve.

6. A process according to claim 1 wherein said cooling means of step e comprises a process cooler.

7. A process according to claim 1 wherein said depressurizing means of step e comprises a level control valve.

8. A process according to claim 1 wherein said separating means of step d comprises a phase separation vessel.

9. A process according to claim 1 further comprising the step of adding a selected flow of dilution water to said oxidation mixture to maintain a water balance within the wet oxidation process.

10. A process according to claim 1 further comprising the step of removing a selected portion of said liquid condensate phase from said separating means to maintain a water balance within the wet oxidation process.

11. A process for wet oxidation of high strength pollutant containing wastewater with a COD of about 25 g/l to about 1,000 g/l, to produce a high solids content oxidized effluent comprising the steps;

(a) mixing a low pollutant content wastewater feed stream and an oxygen-containing gas to form a low strength oxidation feed mixture comprising a gas phase and a liquid phase, said low pollutant content wastewater containing less than about 50 percent of the COD of said high strength wastewater;

(b) heating said low strength oxidation mixture plus said high strength pollutant containing wastewater in a reaction zone to a temperature and a pressure sufficient to maintain a portion of said mixture in the liquid phase, for a time sufficient to remove at least about 50 percent of the COD of the pollutants therein;

(c) withdrawing said gas phase from said reaction zone, cooling and depressurizing said gas phase by cooling means and depressurizing means to produce an offgas phase and a liquid condensate phase;

(d) separating said offgas phase from said liquid condensate phase by separating means;

(e) withdrawing said liquid phase from said reaction zone, cooling and depressurizing said liquid phase by cooling means and depressurizing means to produce an oxidized effluent phase of high solids content with dissolved solids content at about 50 percent of saturation up to nearly complete saturation of the liquid phase therein; and (f) combining a portion of said high solids content oxidized effluent phase with said liquid condensate phase to give said low pollutant content stream of step a.

12. A process according to claim 11 wherein said oxygen-containing gas comprises air, oxygen enriched air or essentially pure oxygen.

13. A process according to claim 11 wherein said reaction zone comprises a vertical bubble column pressure vessel.

14. A process according to claim 11 wherein said cooling means in step c comprises a process heat exchanger or a process cooler.

15. A process according to claim 11 wherein said depressurizing means of step c comprises a pressure control valve.

16. A process according to claim 11 wherein said cooling means of step e comprises a process cooler.

17. A process according to claim 11 wherein said depressurizing means of step e comprises a level control valve.

18. A process according to claim 11 wherein said separating means of step d comprises a phase separation vessel.

19. A process according to claim 13 wherein said high strength liquor is injected directly into said vertical pressure vessel reactor.

20. A process according to claim 11 further comprising the step of adding a selected flow of dilution water to said low strength oxidation mixture or to said high strength pollutant containing wastewater to maintain a water balance within the wet oxidation process.

21. A process according to claim 11 further comprising the step of removing a selected portion of said liquid condensate phase from said separating means to maintain a water balance within the wet oxidation process.

* * * * *